United States Patent [19]
Morse

[11] 3,802,472
[45] Apr. 9, 1974

[54] OVER-ARM SAW

[76] Inventor: Glenn B. Morse, 321 Fountain, N.E., Grand Rapids, Mich. 49502

[22] Filed: Aug. 28, 1972

[21] Appl. No.: 284,282

[52] U.S. Cl. ............... 144/35 R, 144/1 C, 83/477.2, 408/20, 248/124
[51] Int. Cl. ............................................. B27b 5/02
[58] Field of Search ....... 83/477, 477.1, 477.2, 478; 248/12, 13, 124; 408/20; 144/1 C, 1 R, 1 G, 1 H, 35 A

[56] References Cited
UNITED STATES PATENTS

| | | | |
|---|---|---|---|
| 3,656,726 | 4/1972 | Haynes | 248/124 |
| 3,195,591 | 7/1965 | Haberman | 83/477.2 |
| 3,118,261 | 1/1964 | Glaude | 144/35 R |
| 2,655,955 | 10/1953 | Dziengiel, Jr. | 83/477 X |
| 1,925,841 | 9/1933 | Matthews | 83/478 X |

Primary Examiner—Andrew R. Juhasz
Assistant Examiner—W. D. Bray
Attorney, Agent, or Firm—Glenn B. Morse

[57] ABSTRACT

An over-arm saw assembly utilizes the column and table of a drill press, together with a conventional motorized portable circular saw. A worktable is mounted on the drill press table, and a guideway receiving the saw is adjustably mounted on the column in position to establish a path of cutting movement of the saw such that the bottom tangent of the saw is disposed at or slightly below the plane defining the top surface of the worktable.

8 Claims, 5 Drawing Figures

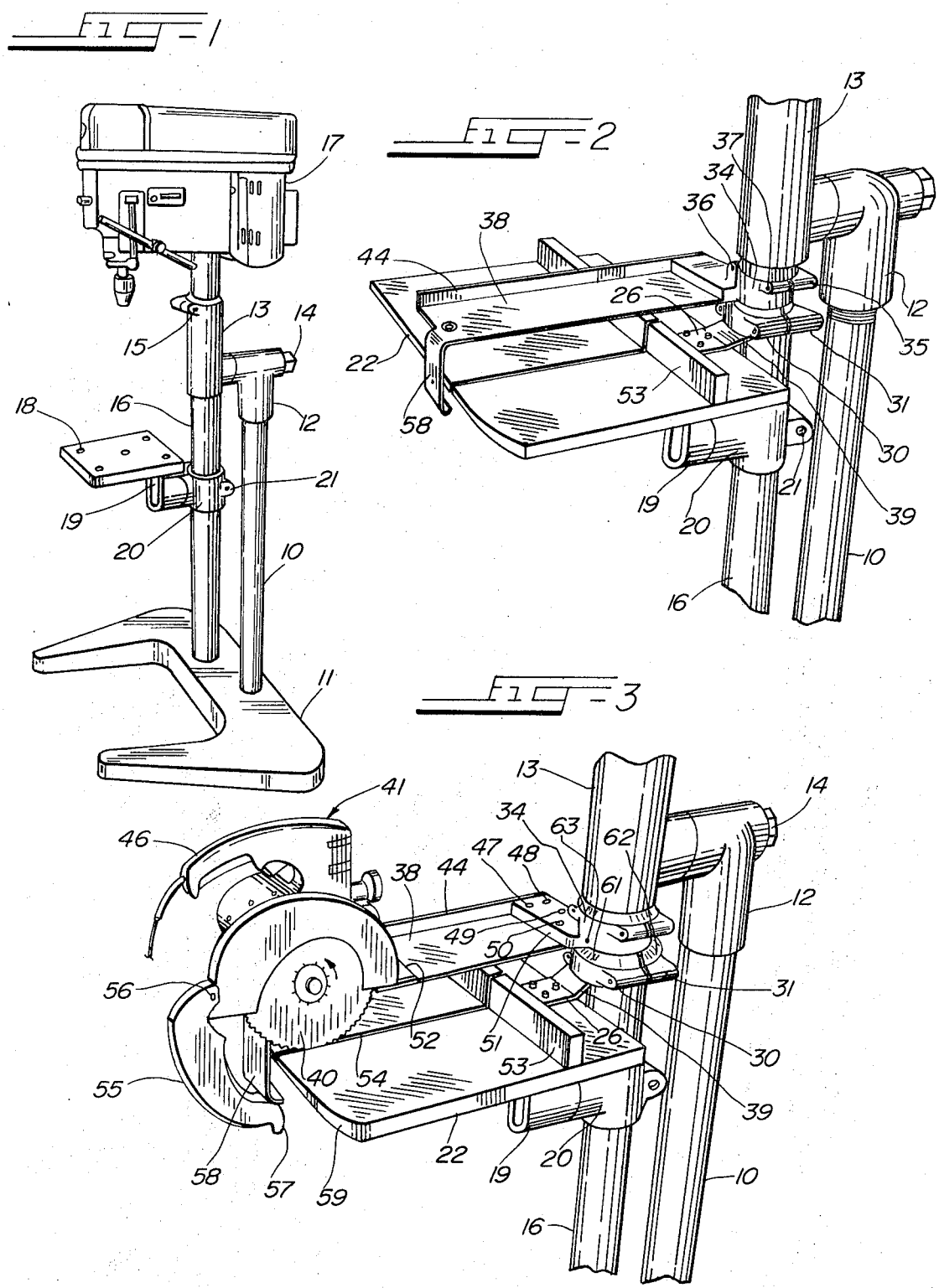

OVER-ARM SAW

BACKGROUND OF THE INVENTION

An "over-arm saw" is a type of cutting machine normally used to cut wood and other materials of comparable hardness and density. These machines usually are provided with a worktable having a reference fence for supporting pieces to be cut. Some form of overhead structure establishes a guideway for a motorized circular saw disposed near a vertical plane, with the lower tangent on the saw slightly below the surface of the worktable. The usual overhead structure includes a vertical column and an arm extending radially from the column (horizontally), which accounts for the name by which the machine is generally known. This type of equipment has been developed comparatively recently, considering the antiquity of the origins of most basic woodworking machinery.

The over-arm saw is a very useful device for doing cut-off work on long or short boards, and for mitring the ends of these boards. The saws are usually adjustable so that the axis of rotation can be inclined to the horizontal, and the over-arm structure is adjustable about the axis of the column, thus resulting in the ability to place the plane of cut of the saw in adjusted positions about both horizontal and vertical axes. This freedom of adjustability has established the over-arm saw as a very handy piece of equipment, and the extent of its use is limited primarily by its cost. The general purpose of this invention is to provide the salient features of the over-arm saw at a cost representing a small fraction of that of the conventional sawing machine, and utilizing equipment and structures which are normally present in the workshop.

SUMMARY OF THE INVENTION

A standard drill press, preferably a floor-model, has a table normally used to support pieces being drilled. This structure is utilized by the present invention to support a saw worktable. The column of the drill press (normally extending from the base to the powerhead) is utilized as a means for supporting and aligning a guideway to establish a path of cutting movement of a portable powered circular saw. This saw is normally provided with a guard pivotally mounted at such a position that the guard swings downward on engagement of the saw with a board being cut. This down-swing would tend to interfere with the worktable, but a cam is provided on the guideway structure for intercepting the saw guard and swinging it downward at a clearance position with respect to the worktable, so that the saw can proceed across the worktable and perform its cutting action without interference. This cam has the additional function of providing a shield protecting the operator from the saw blade, which is exposed on retraction of the guard. The preferred form of the machine also includes a thrust-bearing collar positioned by the worktable at such a point that the bracket carrying the guideway is supported so that the bottom tangent of the saw blade is between the planes defining the top and bottom of the worktable.

DESCRIPTION OF THE DRAWINGS

FIG. 1 is a perspective view of a drill press with the table in a position appropriate to receive the components of the present invention.

FIG. 2 is a perspective view on an enlarged scale over FIG. 1, showing the components of the invention installed on the drill press table.

FIG. 3 is a perspective view showing the commencement of a cutting movement along a path perpendicular to the reference fence.

DESCRIPTION OF THE PREFERRED EMBODIMENTS

Figure 4:
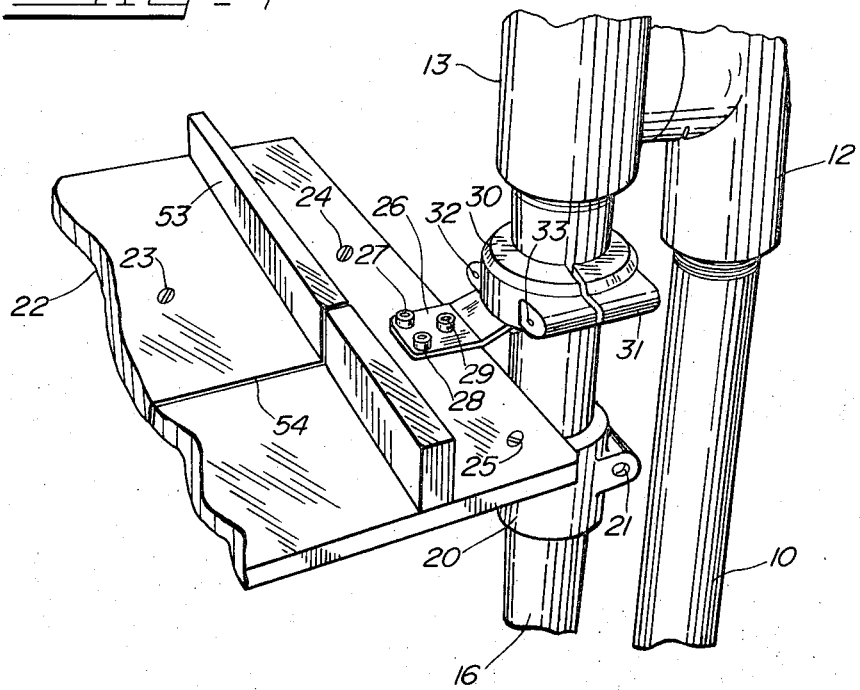
FIG. 4 is a perspective view showing the structure for establishing the relative placement of the table and the thrust-bearing collar.

The machine shown in FIG. 1 is of the type described in U. S. Pat. No. 2,963,057. A rear column 10 is fixed with respect to a base 11. A pivot fulcrum member 13 rotatively supports a stub shaft (not shown) of the column clamp 13, and the nut 14 on the stub shaft is adjustable to vary the degree of resistance to rotation of the clamp 13 with respect to the fulcrum member 12. The clamp bolt 15 is adjustable to secure or free the front column 16 for rotative and axial movement, thus providing corresponding adjustment for the placement of the powerhead 17. The table 18 has an offset arm 19, the lower end of which is pivotally connected to the table bracket 20 by a bolt in the conventional manner. The table bracket 20 can be loosened or constricted about the front column 16 by adjustment of the clamping bolt 21.

While the present over-arm saw equipment is shown installed in FIG. 1 on the pivotable type of drill press, it is also useable in conjunction with a fixed drill press, in which the column 10 extends upward to a point of engagement with the powerhead 17. In either case, the support table 18 of the drill press forms a platform for receiving the work table 22 secured in place with screws 23–25, as shown best in FIG. 4. A locating arm 26 is secured to the table 22 with the bolt-nut assemblies 27–29, and is secured at its opposite end to the section 30 of a collar surrounding the front column 16. The opposite section 31 of this collar is secured with respect to the section 30 by bolts 32 and 33. A bracket 34 has a rear clamping section 35 secured to the bracket 34 by bolts 36 and 37. When these bolts are loosened slightly, the bracket 34 is rotatable and axially slidable with respect to the column 16. The underside of this bracket is axially engagable with the upper surface of the sections 30 and 31 of the collar, which functions as a thrust bearing positioning the bracket 34 vertically. This vertical placement establishes the distance of the guideway plate 38 above the top surface of the table 22. The offset portion 39 of the arm 26 is established such that this distance is exactly appropriate to place the lower tangent to the blade 40 in a position just intersecting the plane of this surface. The motorized portable saw 41 carrying the blade 40 is completely conventional, and has a base plate 42 and a motor 43. The plate 38 functions as a guideway through the interengagement of the flange 44 with the edge 45 of the base plate 42. A gentle pressure applied to the handle 46 of the saw toward the flange 44 will permit the flange to establish the path of the saw during the cutting movement from left to right as viewed in FIG. 3. The guide plate 38 is secured to the bracket 34 with screws as indicated at 48–50 in FIG. 3, and thus functions as a cantilever beam in supporting the weight of the saw 41. The front edge 51 of the bracket 34 forms a stop abutment engagable with the edge 52 of the saw base plate 42 at a position such that the bottom tangent of the saw 40 should intersect the junction between the surface of the table 22 and the reference rail 53. The material of the table 22 and that of the reference rail 53 should be of wood or of comparable hardness and density, so that the saw 40 can cut it easily. The cutting movement of the blade 40 will produce a undergroove path as shown at 54 in FIG. 3.

Figure 5:
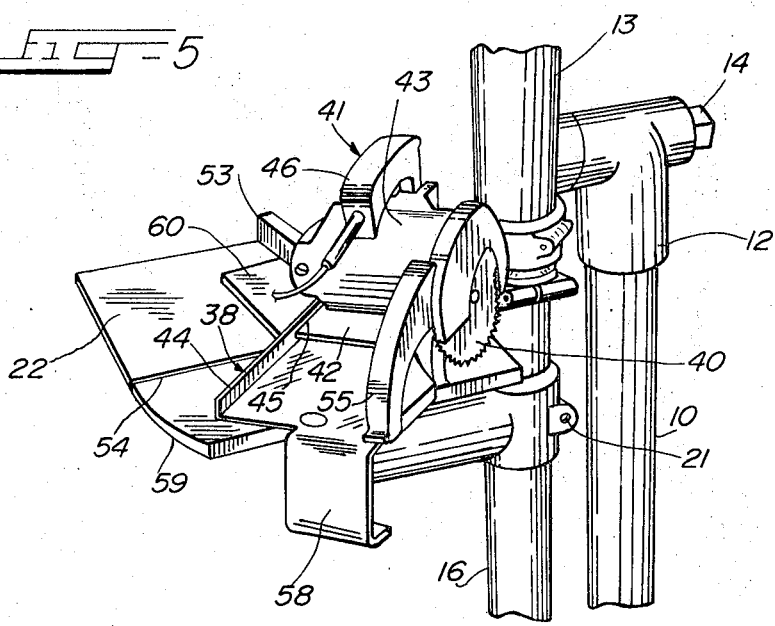
FIG. 5 illustrates the relative placement of the components appropriate for establishing a cut at approximately 45° with respect to the reference fence.

A portable powered saw is usually provided with a saw guard 55 pivotally connected to the body 56 in a position such that it can swing downward on engagement of the arcuate tip 57 with a board that the saw is engaging. A board placed on the table 22, and engaged by the edge 57 of the guard, would cause the guard to swing downward into interference with the top of the table. To eliminate this tendency, the guideway plate 38 is provided with a depending cam portion 58 disposed in a position to intercept the portion of the saw guard 53 on the handle side of the saw with respect to the blade 40. The guard 55 is thus swung down out of a position where it can interfere with the table 22. Continued movement from left to right, as viewed in FIG. 3, will ultimately cause the saw guard 55 to extend to the rear, as shown in FIG. 5, at which time it may be considered as either supported by the cam portion 58 or by the adjacent edge of the guideway plate 38. With the guard 55 in the fully retracted position, the cam portion 58 also provides a shield keeping the hands of the operator free of the exposed saw blade 40. Since the guide plate 38 functions as a radius arm moving about the axis of the column 16, the front edge of the table is given coaxial arcuate configuration as shown at 59 to maintain the appropriate clearance between the cam portion 58 and the table in all positions of the assembly.

An attempt to swing the arm 38 in a clockwise direction, as viewed in FIG. 3 would bring the cam portion 58 into interference with the front edge of the table, which may be considered as a stop limiting the sector of movement of the arm in that direction. The arm can, of course, be swung counterclockwise beyond a position in which the saw is capable of engaging anything held against the reference fence 13. All of the portions of the table capable of being traversed by the saw in the sector thus defined is kept free of fastening securing the worktable to the supporting drill press table 18. These fastenings are thus distributed as shown in FIG. 4, leaving the table area clear of any metalic fastenings which might damage the saw blade 40. A board may be placed on the table 22, and pressed back against the reference fence 53, with the assurance that the saw can properly perform its cutting operation with the arm 38 set to establish any angle of cut. It should be noted that most powered portable saws are provided with an adjustment that will permit the saw blade to assume an angle other than perpendicular to the plane of the base plate. Referring to FIG. 5, the saw can easily be adjusted in this manner in a clockwise direction with respect to the base plate by this conventional adjustment without interfering with the relationship of the saw with the remainder of the structure. The beveled angular surfaces 61 and 62 on the collar sections 30 and 31, respectively, are preferably provided with indicia indicating the angular relationship between the collar and the bracket 34 by providing a reference point as shown at 63 on an adjacent portion of the bracket.

I claim:

1. In combination with a structure having a cylindrical column and a mounting table assembly including a bracket portion angularly adjustable about the axis of said column, and further in combination with a portable motorized circular saw having a base plate, a saw blade normally traversing the plane defining the underside of said base plate, and a saw guard pivotally mounted at a position on said saw to swing normally downward and rearward with respect to the direction of cutting movement of said saw, said direction being substantially parallel to said saw blade and to an edge of said base plate, an over-arm saw device including a worktable provided with an alignment fence and also including guideway means disposed to establish a path of movement above the plane of the normally top surface of said work table, wherein the improvement comprises:

means securing said work table to said mounting table in predetermined relationship about the axis of said column;

a bracket mounted on said column for angular and axial adjustment with respect to the axis thereof; and means securing said guideway means to said bracket, said saw being movably receivable on said guideway means in guided relationship.

2. A device as defined in claim 1, wherein said guide means is an arm plate having a flange engageable with said saw base plate edge with said saw blade clearing said arm plate.

3. A device as defined in claim 1, wherein said guideway means has a cam portion engageable with said saw guard on cutting movement of said saw along said guide means, said cam portion being operative to swing said guard downward at a clearance postion with respect to said work table.

4. A device as defined in claim 3, wherein said guide means is an arm plate having a flange engageable with said saw base plate edge with said saw blade clearing said arm plate, and said cam portion is disposed downward from and transversely with respect to said arm plate to additionally form a shield to said saw blade on retraction of said saw guard by said cam portion.

5. A device as defined in claim 1, additionally including a collar adjustably secureable to said column to form a supporting thrust bearing to said bracket.

6. A device ad defined in claim 5, additionally including a locating arm and means normally securing said work table and collar angularly and axially with respect to the axis of said column.

7. A device as defined in claim 6, wherein said locating arm has a configuration causing placement of the bottom tangent of said saw blade between the planes defining the upper and lower surfaces of said work table.

8. A device as defined in claim 7, wherein said work table is constructed of a material readily cuttable by said saw blade, and said means securing said work table to said support table are disposed outside the area on the top of said work table traverseable by said saw blade.

* * * * *